United States Patent
Murphy

(10) Patent No.: US 7,308,347 B2
(45) Date of Patent: Dec. 11, 2007

(54) FRAME-BASED OCCUPANT WEIGHT ESTIMATION APPARATUS HAVING COMPLIANT LOAD TRANSFER MECHANISM

(75) Inventor: Morgan D. Murphy, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 336 days.

(21) Appl. No.: 10/618,952

(22) Filed: Jul. 14, 2003

(65) Prior Publication Data

US 2005/0027418 A1    Feb. 3, 2005

(51) Int. Cl.
*G01G 19/52* (2006.01)

(52) U.S. Cl. .................. 701/45; 180/273; 73/862.628; 177/144

(58) Field of Classification Search .................. 701/45, 701/46, 47, 36; 280/728.1, 735; 296/65.01; 177/144, 170, 176, 154; 73/1.13, 862.627, 73/862.628; 180/273; 340/667, 666
See application file for complete search history.

(56) References Cited

U.S. PATENT DOCUMENTS

| | | | |
|---|---|---|---|
| 5,474,327 A | 12/1995 | Schousek | 280/735 |
| 5,942,695 A | 8/1999 | Verma et al. | 73/768 |
| 5,987,370 A | 11/1999 | Murphey et al. | 701/45 |
| 6,012,007 A | 1/2000 | Fortune et al. | 701/45 |
| 6,058,341 A | 5/2000 | Myers et al. | 701/45 |
| 6,101,436 A | 8/2000 | Fortune et al. | 701/45 |
| 6,138,067 A | 10/2000 | Cobb et al. | 701/45 |
| 6,161,891 A * | 12/2000 | Blakesley | 296/65.01 |
| 6,246,936 B1 | 6/2001 | Murphey et al. | 701/45 |
| 6,360,618 B2 | 3/2002 | Anahid et al. | 73/862.627 |
| 6,424,898 B2 | 7/2002 | Anishetty et al. | 701/45 |
| 6,438,476 B1 | 8/2002 | Gray et al. | 701/45 |
| 6,438,477 B1 | 8/2002 | Patterson et al. | 701/45 |
| 6,479,776 B2 | 11/2002 | Gray et al. | 200/559 |
| 6,542,802 B2 | 4/2003 | Gray et al. | 701/45 |
| 6,578,871 B2 | 6/2003 | Gray et al. | 280/735 |
| 6,587,770 B1 * | 7/2003 | Gray et al. | 701/45 |
| 6,748,814 B2 * | 6/2004 | Ishida et al. | 73/862.391 |
| 6,774,319 B2 * | 8/2004 | Aoki et al. | 177/144 |
| 6,841,741 B2 * | 1/2005 | Kajiyama | 177/144 |
| 6,940,026 B2 * | 9/2005 | Rundell et al. | 177/144 |
| 2004/0011570 A1* | 1/2004 | Sakamoto et al. | 177/144 |
| 2005/0011682 A1* | 1/2005 | Murphy | 177/144 |

FOREIGN PATENT DOCUMENTS

| | | |
|---|---|---|
| DE | 10145370 A1 | 12/2002 |
| EP | 1267150 A | 12/2002 |
| EP | 1319549 A | 6/2003 |

* cited by examiner

*Primary Examiner*—Tuan C To
(74) *Attorney, Agent, or Firm*—Jimmy L. Funke

(57) ABSTRACT

A frame-based occupant weight estimation apparatus for a vehicle seat includes compliant load transfer mechanisms interposed between the seat frame and floor brackets bolted to the vehicle floor. The compliant load transfer mechanisms translate the seat loads to a central location for measurement by a set of force sensors. The load transfer mechanisms preload the force sensor to enable off-loading detection, and an overload device securely anchors the seat to the floor bracket without interfering with normal load measurement.

2 Claims, 1 Drawing Sheet

FRAME-BASED OCCUPANT WEIGHT ESTIMATION APPARATUS HAVING COMPLIANT LOAD TRANSFER MECHANISM

TECHNICAL FIELD

This invention is directed to apparatus for detecting the weight of an occupant of a motor vehicle seat for purposes of determining whether and how forcefully to deploy supplemental restraints, and more particularly to apparatus for measuring forces applied to a frame of the vehicle seat.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

Most prior weight estimation techniques involve installing a pressure sensitive element such as a variable resistance pad or a fluid filled bladder in or under a vehicle seat cushion, and utilizing the pressure measurement as an indication of occupant weight. See, for example, the U.S. Pat. Nos. 5,474,327, 5,987,370, 6246936, 6,101,436 and 6,490,936, assigned to the assignee of the present invention and incorporated by reference herein.

Alternatively, the occupant weight may be measured with one or more load cells that sense the forces (strain or pressure) that the seat applies to a bracket that supports the seat on the vehicle floor. See, for example, the Publication Nos. 41520, 41542, 41549 and 41559 from the November, 1998 issue of Research Disclosure. Since the "frame-based" load cell configurations become part of the supporting structure of the seat, they tend to be relatively bulky and/or expensive to produce. Accordingly, what is needed is a frame-based occupant weight estimation apparatus that is simple and inexpensive to produce, and that does not compromise the structural integrity of the seat.

SUMMARY OF THE INVENTION

The present invention is directed to an improved frame-based occupant weight estimation apparatus for a vehicle seat, including compliant load transfer mechanisms interposed between the seat frame and floor brackets bolted to the vehicle floor. The compliant load transfer mechanisms translate the seat loads to central locations for measurement by a set of force sensors. The load transfer mechanisms preload the force sensor to enable off-loading detection, and an overload device securely anchors the seat to the floor bracket without interfering with normal load measurement.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
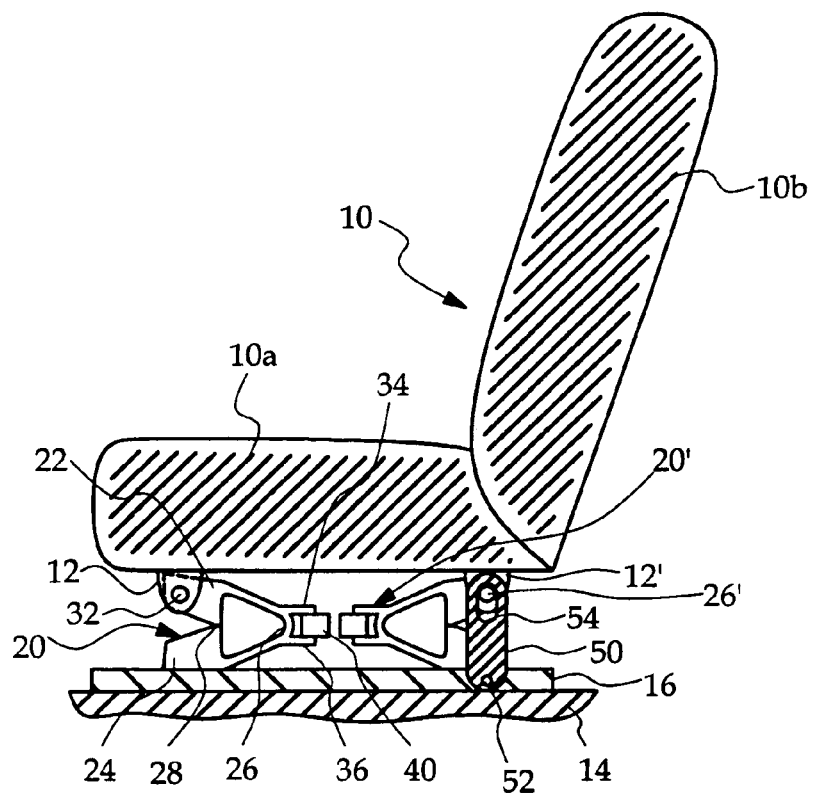
FIG. 1 is a side-view diagram of a vehicle seat incorporating the frame-based occupant weight estimation apparatus of the present invention.

Referring to the drawings, and particularly to FIG. 1, the reference numeral 10 generally designates a vehicle seat, including seat and backrest cushions 10a, 10b supported on a frame including a set of mounting brackets 12. The seat 10 is secured to the vehicle floor 14 by a pair of laterally spaced floor brackets 16, 18 that are bolted to floor 14, and a set of load transfer mechanisms 20 are interposed between the seat mounting brackets 12 and the floor brackets 16, 18 for supporting the seat 10 and estimating the weight of a seat occupant. In the illustrated embodiment, there are four seat mounting brackets (left front, right front, left rear and right rear) and four associated load transfer mechanisms, but only the left-front and left-rear seat mounting brackets 12, 12' and the left-front and left-rear load transfer mechanisms 20, 20' are visible in the drawings. As indicated in FIG. 1, the left-front and left-rear load transfer mechanisms 20, 20' are mirror image but otherwise identical; accordingly the following description of the load transfer mechanism 20 applies equally to load transfer mechanism 20' as well as the right-front and right-rear load transfer mechanisms.

The load transfer mechanism 20 is a compliant one-piece device formed of a suitable polymer material. It is similar to compliant pliers, and is a combination of rigid and compliant sections based on cross-sectional area. According to the present invention, the load transfer mechanism 20 translates a portion of the seat load at mounting bracket 12 to a force sensor disposed near the fore-aft midsection of seat 10. The mechanism 20 includes first and second co-joined lever arms 22 and 24. The lever arms 22 and 24 are physically joined at an active joint 26 and maintained in abutment at a point 28, which effectively constitutes a passive joint. In general, a passive joint is a joint that allows relative rotation between rigid segments (that is, the outboard ends of lever arms 22, 24) without using a pin joint. The rigid outboard ends of the arms 22 and 24 are respectively coupled to the seat mounting bracket 12 (via a pin 32) and the floor bracket 16, and the inboard ends terminate in jaws 34 and 36 that apply a compressive force to a force sensor 40. The force sensor 40 may be a strain gauge device or load cell such as produced and sold by Panasonic Corporation or Texas Instruments Corporation, and develops an electrical output signal functionally related to the force applied to it by the jaws 34, 36.

When the mechanism 20 is in a relaxed state prior to installation in the vehicle, the jaws 34, 36 are pried apart to receive the force sensor 40, which applies a pre-load force to the force sensor 40. On installation, the weight of the seat 10 acting on the arms 22 and 24 through mounting bracket 12 and floor bracket 16 increases the preload force, and load changes associated with occupant loading and unloading correspondingly increases and decreases the compressive force applied to force sensor 40. The preload applied to force sensor 40 is particularly important in frame-based occupant weight estimation because it enables off-loading detection. This can occur, for example, when the occupant leans back in the seat 10, reducing the force measured by the force sensors associated with the mounting brackets on the front of the seat 10. Due to the preload force, such off-loading can be measured and taken into consideration in the weight estimation calculations.

An overload plate 50 depicted at the left-rear seat mounting bracket 12' limits upward movement of the seat 10 with respect to the floor bracket 16 in the event of a crash. In actuality, overload plates are typically installed at each of the four seat frame mounting brackets, but are omitted in FIG.

1 so as not to obscure the load transfer mechanism 20. The plate 50 is anchored on a post 52 formed on floor bracket 16, and has an elongated aperture 54 through which a pin 26' extends. The pin 26' does not contact the plate 50 in normal operation, but contacts the plate 50 when a strong upward force is applied to seat 10.

Figure 2:
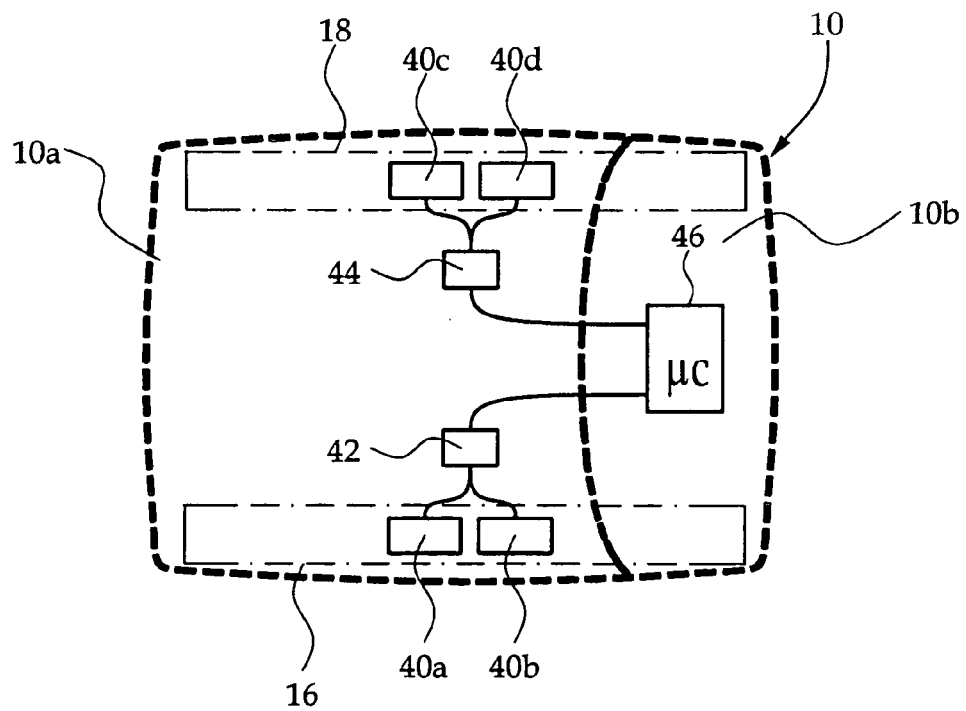
FIG. 2 is a diagram of the electrical components of the apparatus of FIG. 1.

FIG. 2 depicts the force sensor layout for the embodiment of FIG. 1, with the force sensors 40a and 40b being supported above the floor bracket 16, and the force sensors 40c and 40d being supported above the floor bracket 18. The co-located sensors 40a, 40b are electrically coupled to a first connector 42, while the co-located sensors 40c, 40d are electrically coupled to a second connector 44. The connectors 42 and 44, in turn are electrically coupled to a microcontroller (uC) 46, which may be located beneath the seat 10 as shown or at a remote location. The microcontroller 46 processes the output signals produced by the sensors 40a, 40b, 40c, 40d to determine corresponding weights attributable to a seat occupant, and sums the weights to determine the occupant weight or weight classification for purposes of deciding whether and how forcefully to deploy supplemental restraints designed to protect the occupant from serious injury in a crash event.

In summary, the present invention provides a seat frame-based occupant weight estimation apparatus including a compliant force transfer mechanism that translates vertical force associated with occupant weight to a central location for measurement by a pre-loaded force sensor. While described with respect to the illustrated embodiment, it will be recognized that various modifications in addition to those mentioned above may occur to those skilled in the art. For example, the seat 10 may be supported by a greater or lesser number of force transfer mechanisms 20 the force transfer mechanisms 20 may be oriented laterally with respect to the seat 10, and so on. Accordingly, it will be understood that systems incorporating these and other modifications may fall within the scope of this invention, which is defined by the appended claims.

The invention claimed is:

1. Apparatus for estimating the weight of an occupant of a vehicle seat supported by a floor bracket, the apparatus comprising:

a force sensor;

a compliant force transfer mechanism interposed between said floor bracket and a mounting bracket of said seat, including first and second co-joined lever arms coupled to said floor bracket and said mounting bracket, where said lever arms terminate in first and second jaws that engage said force sensor, where said jaws exert a pre-load engagement force on said force sensor, and where occupant weight applied to said seat produces movement of said lever arms that increases said engagement force, whereby said force sensor produces an output signal indicative of said occupant weight, wherein said first lever arm is rotatably coupled to said mounting bracket and said second lever arm is rigidly secured to said floor bracket, and wherein said first and second lever arms are interconnected at an active joint adjacent said jaws and a passive joint that limits relative displacement therebetween; and overload means for limiting upward movement of said seat mounting bracket with respect to said floor bracket to prevent said seat from becoming detached from said floor bracket, said overload means including a vertically extending plate coupled to one of said brackets and spaced adjacent the other of said brackets for engagement thereof in response to a predetermined upward displacement of said seat.

2. Apparatus for estimating the weight of an occupant of a vehicle seat supported by a floor bracket, the apparatus comprising:

a force sensor; and a compliant force transfer mechanism interposed between said floor bracket and a mounting bracket of said seat, including first and second co-joined lever arms coupled to said floor bracket and said mounting bracket, where said lever arms terminate in first and second jaws that engage said force sensor, where said jaws exert a pre-load engagement force on said force sensor, and where occupant weight applied to said seat produces movement of said lever arms that increases said engagement force, whereby said force sensor produces an output signal indicative of said occupant weight, wherein said seat includes a set of mounting brackets,and the apparatus includes a force sensor and compliant force sensors are co-located in paris to facilitate electrical connections to the force sensors, wherein said first lever arm is rotatably coupled to said mounting bracket and said second lever arm is rigidly secured to said floor bracket, and wherein said first and second lever arms are interconnected at an active joint adjacent said jaws and a passive joint that limits relative displacement therebetween.

* * * * *